W. P. HANSEN.
SPRING MOTOR.
APPLICATION FILED NOV. 22, 1910.
1,008,141.
Patented Nov. 7, 1911.
5 SHEETS—SHEET 4.
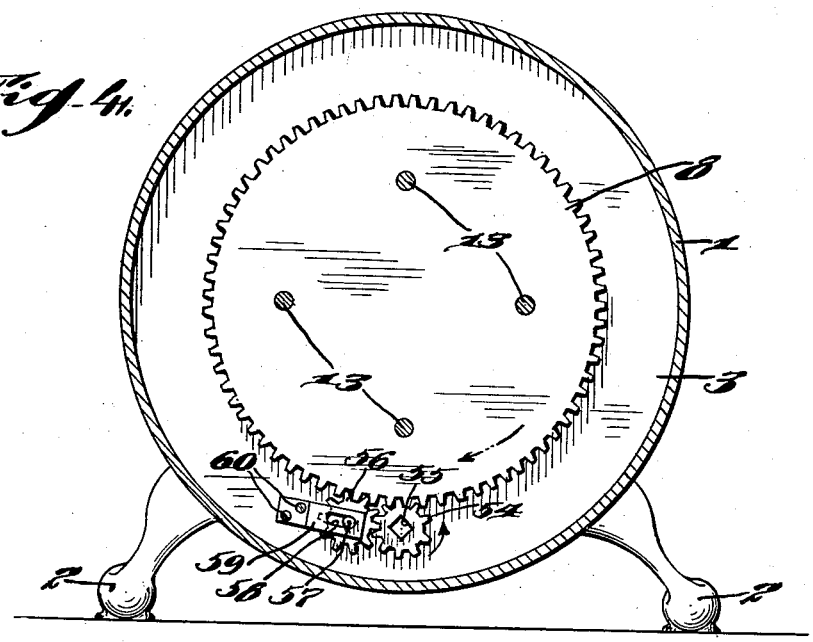
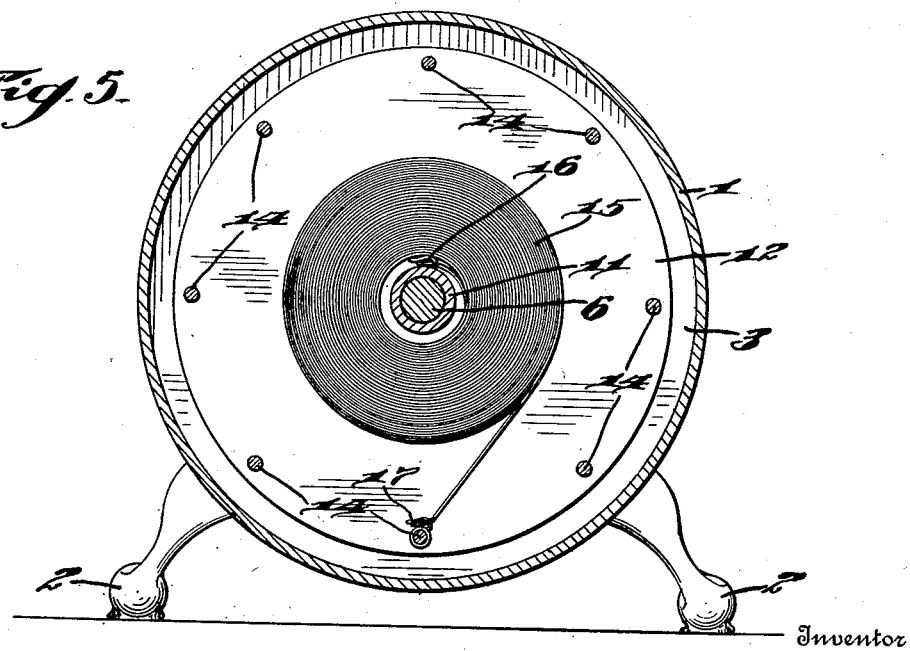

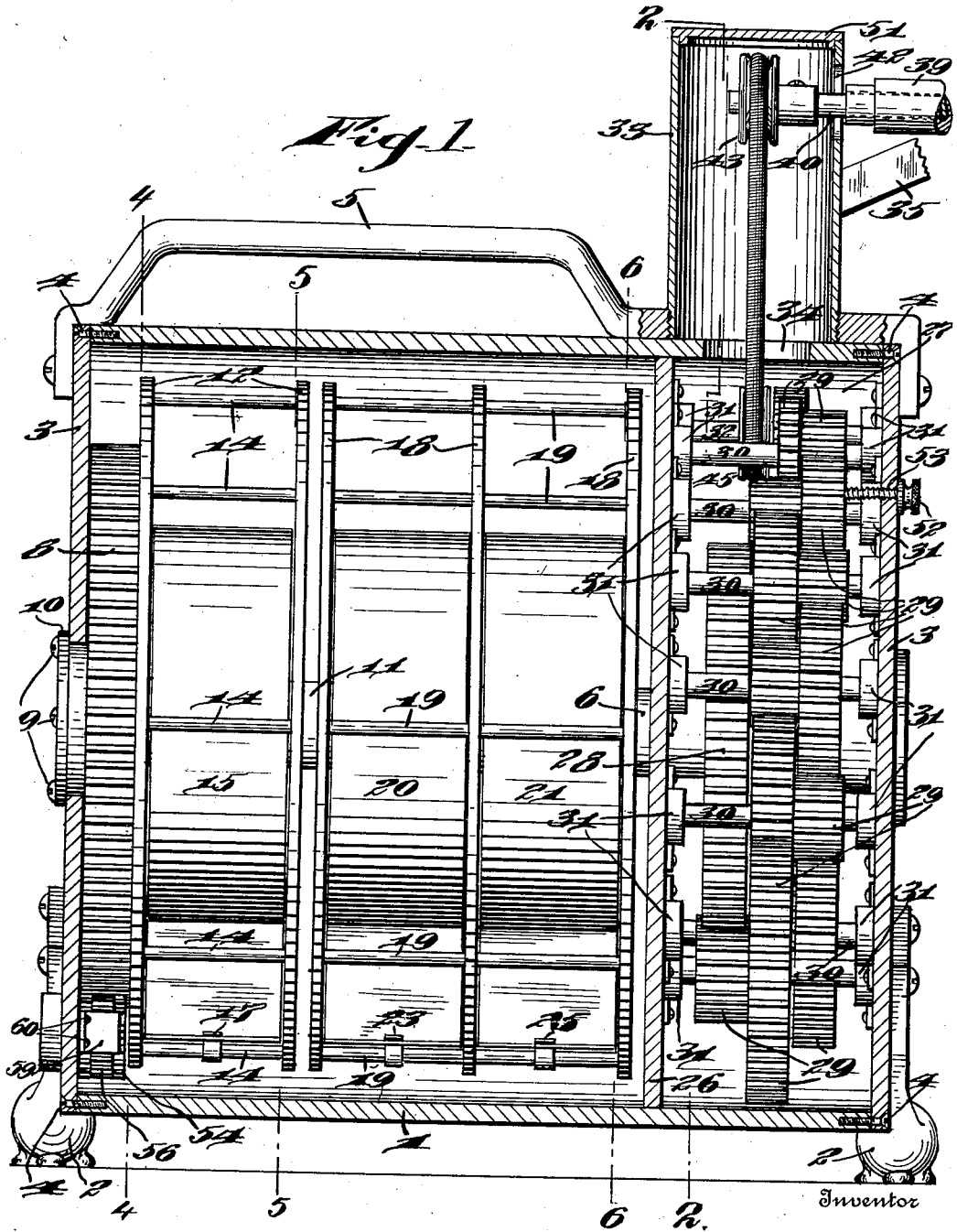

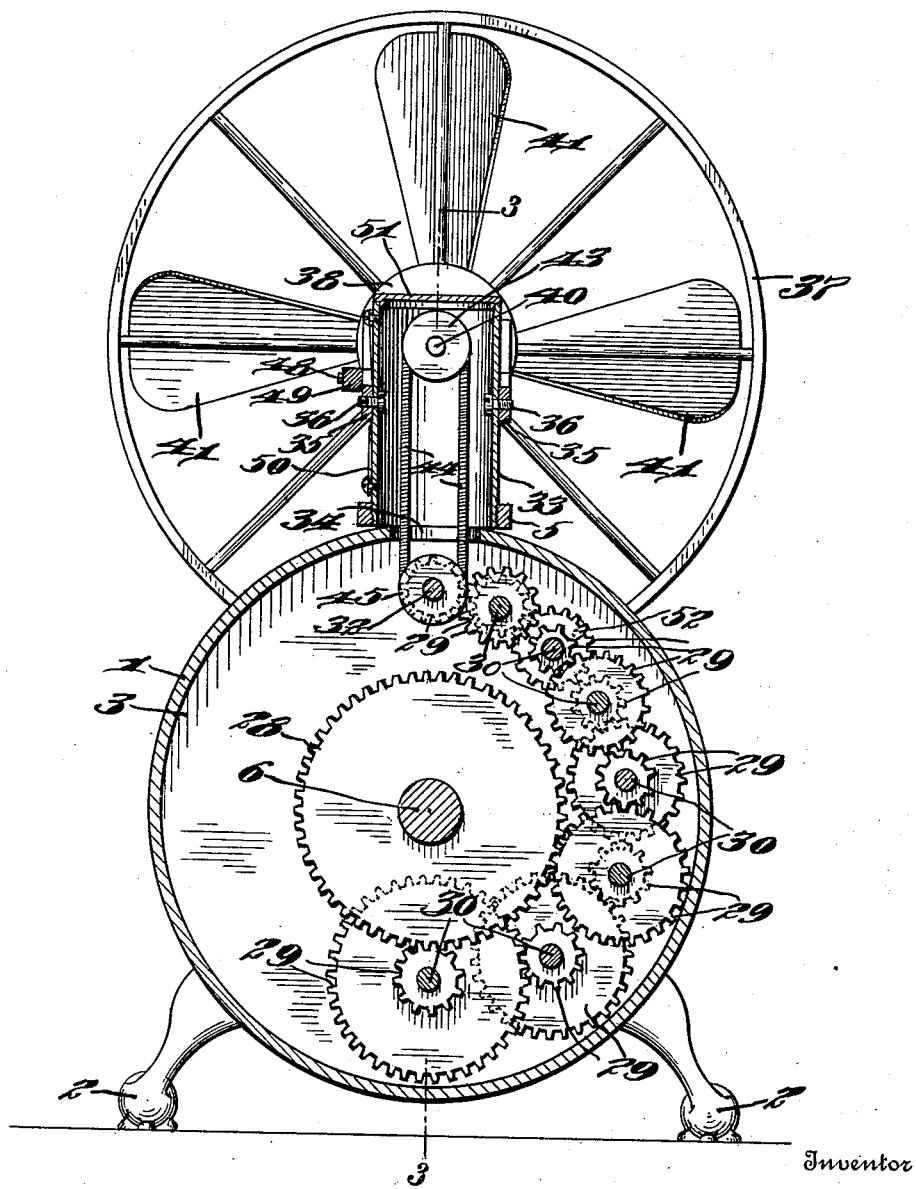

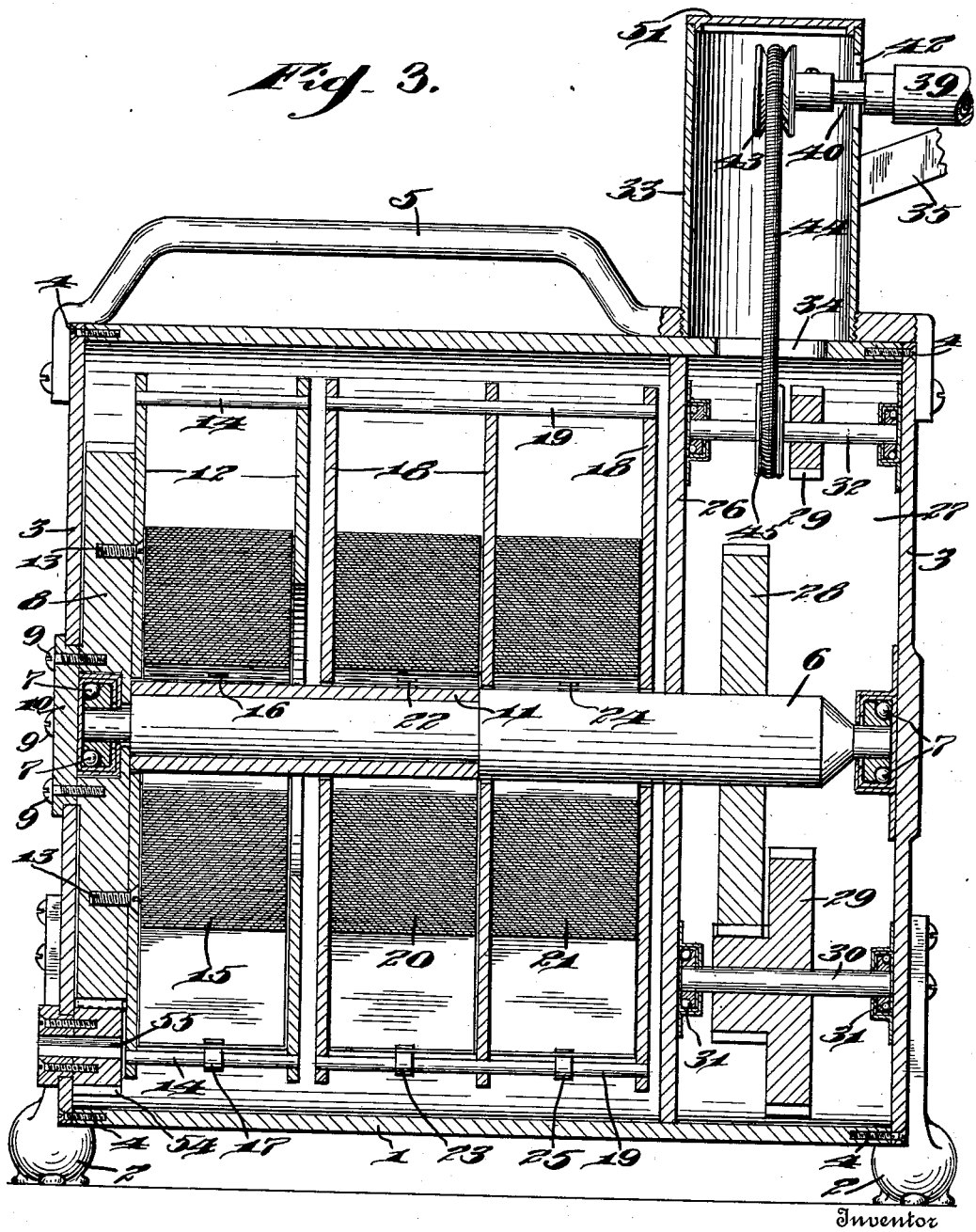

W. P. HANSEN.
SPRING MOTOR.
APPLICATION FILED NOV. 22, 1910.
1,008,141.
Patented Nov. 7, 1911
5 SHEETS—SHEET 5.
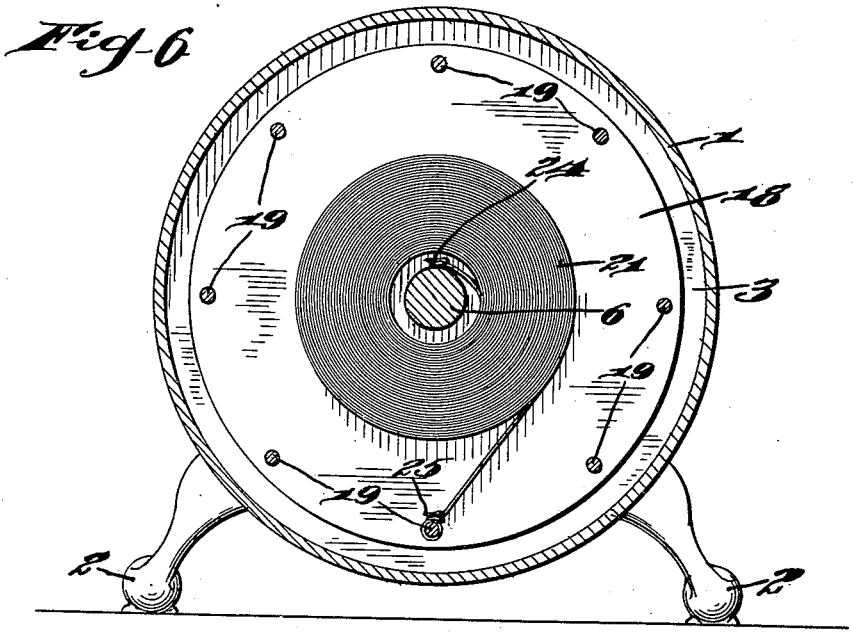
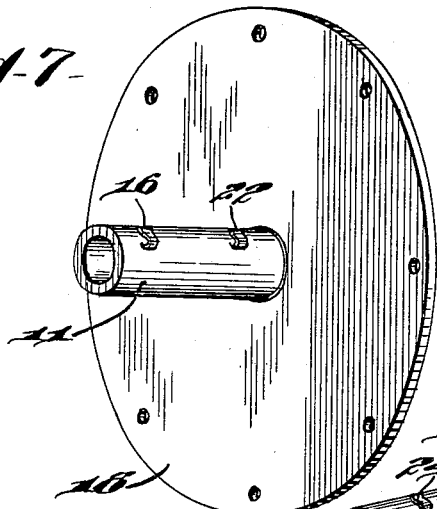
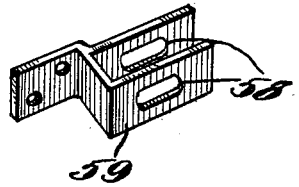
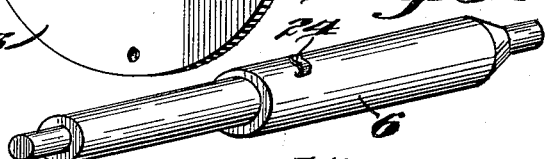

UNITED STATES PATENT OFFICE.

WILLIAM PETER HANSEN, OF CAMDEN, NEW JERSEY, ASSIGNOR, BY MESNE ASSIGNMENTS, TO SPRING MOTOR FAN COMPANY, OF PHILADELPHIA, PENNSYLVANIA.

SPRING-MOTOR.

1,008,141. Specification of Letters Patent. Patented Nov. 7, 1911.

Application filed November 22, 1910. Serial No. 593,607.

*To all whom it may concern:*

Be it known that I, WILLIAM P. HANSEN, a citizen of the United States, residing at Camden, in the county of Camden and State of New Jersey, have invented certain new and useful Improvements in Spring-Motors, of which the following is a specification.

My invention relates to improvements in spring motors, the object of the invention being to provide a spring motor particularly adapted for use with a fan, which will drive the fan for a considerable length of time without the necessity of rewinding, and revolve the fan at a sufficient speed so as to create a draft or blast of air.

A further object is to provide an improved arrangement of springs operating in series exerting each its separate power upon the main arbor of the device, and not operating to compound the pressure on the arbor, but to compound the length of winding, and the time of rotary transmission imparted to the arbor.

With these and other objects in view, the invention consists in certain novel features of construction and combinations and arrangements of parts, as will be more fully hereinafter described and pointed out in the claims.

In the accompanying drawings: Figure 1, is a view in section through the casing and in elevation of the motor and transmitting mechanism. Fig. 2, is a view in cross section on the line 2—2 of Fig. 1. Fig. 3, is a view in longitudinal section on the line 3—3 of Fig. 2. Fig. 4, is a view in cross section on the line 4—4 of Fig. 1. Fig. 5, is a view in cross section on the line 5—5 of Fig. 1. Fig. 6, is a view in cross section on the line 6—6 of Fig. 1, and Figs. 7, 8, and 9, are views of details of construction.

1, represents a cylindrical casing supported on suitable feet 2, and having its ends or heads 3 secured in the casing by means of screws 4, and 5 is a handle secured to the casing as shown so as to facilitate the movement of the apparatus from place to place.

Located centrally in the casing and extending longitudinally thereof, is the main arbor 6 which is preferably of two diameters as illustrated, and at its reduced ends is supported in ball bearings 7. One of said ball bearings 7 is secured to the front head 3, and the other ball bearing is mounted in a winding gear 8 mounted to turn on arbor 6 and secured by screws 9 with a disk 10 which closes a central opening in the rear head 3.

On the reduced diameter of the arbor 6, a sleeve 11 is mounted to turn, and a spring confining cage 12 is mounted to turn around this sleeve 11, and is secured by screws 13 to the winding gear 8. The cage 12 comprises two disks connected by rods 14, and spaced apart a distance slightly greater than the width of a main spring 15 which is connected at its inner end to a hook 16 on the sleeve 11, and at its outer end to a hook 17 on one of the rods 14.

18, represents a double spring cage which comprises three disks mounted to turn on the arbor 6 and sleeve 11 respectively, connected by rods 19 and confining two main springs 20 and 21 respectively. Main spring 20, which is adjacent spring 15, is connected at its inner end to a hook 22 on sleeve 11, and at its outer end to a hook 23 on one of the rods 19.

Spring 21 is connected at its inner end to a hook 24 on arbor 6, and at its outer end to a hook 25 on one of the rods 19. These springs are so mounted that they will operate in series transmitting to the arbor a rotary motion for a length of time equal to a spring of three times the length of any of those above described, and not simply a multiplied power of three springs as will hereinafter appear.

A partition 26 is secured in the casing, and divides the spring inclosing portion thereof from a gear chamber 27 located in the forward end of the casing. In this gear chamber, a relatively larger gear 28 is fixed to the arbor 6, and serves to drive a circular series or train of gears 29 supported on short arbors 30 mounted in ball bearings 31 on the front head 3 and partition 26 respectively, so that power is transmitted from the arbor 6 to an arbor 32 in the upper portion of chamber 27.

On top of casing 1, a cylindrical casing 33 is secured and communicates by means of an opening 34 with chamber 27. Arms 35 are pivotally connected to casing 33 as shown at 36, and at their outer ends are secured to a fan guard 37 which latter in turn is secured to a collar 38 on a bearing sleeve 39 through which the fan shaft 40 projects, and is provided on its outer end with a fan 41 mounted to turn in the guard 37. The inner end of this shaft 40 projects through an elongated opening 42 in casing 33, and is provided on its inner end with a pulley 43 which is connected by an endless spring band 44 with a pulley 45 on the arbor 32.

To control the starting and stopping of the motor, a thumb screw 52 is located in a screw-threaded opening 53 in the front head 3, and bears against the face of one of the gears of the train of gearing 29, so that it frictionally holds the gears against turning, or permits them to turn as desired.

In winding the springs, assuming that all of the springs have run down, the first motion of gear 8 which turns the cage 12 with it, will be imparted to spring 15, tending to wind the said spring on sleeve 11. As this spring 15 winds up sufficient to overcome the resistance of sleeve 11, the latter will begin to turn to wind spring 20 from the inside, and when sufficiently strong, this spring 20 will cause cage 18 to turn winding spring 20 from the outside and this winding action is maintained until all of the springs are tightly wound.

It will thus be noted that by reason of this structure and the way of mounting the springs, that the latter operate in series to turn the arbor a length of time equal to the length of time that it takes the several springs to unwind separately, or in other words, the arbor will be given three times as many revolutions as would one spring, and not the same number of revolutions with three times the power, as would be the case if the springs were coupled as is ordinarily done.

By reason of the chain of gearing 29, a single revolution of arbor 6 imparts a great number of revolutions to arbor 32, and through the medium of band 44 and shaft 42, the fan is revolved at a comparatively high speed, and for a relatively great length of time.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. In a mechanism of the character described, the combination with a casing, of an arbor in said casing of two diameters, a sleeve on the smaller diameter of said casing, a double cage partly on said sleeve and partly on said larger diameter of the arbor, a single cage on said sleeve, a spring in the single cage connected at one end to the sleeve and at its other end to the cage, two springs in the double cage, one spring connected to the sleeve and to the cage, and the other spring connected to the cage and to the arbor, substantially as described.

2. In a mechanism of the character described, the combination with a casing, of an arbor mounted in the casing, and of two diameters, a sleeve mounted to turn on the smaller diameter of the arbor, a single and a double cage mounted to turn on the arbor and sleeve, a spring located in the single cage and connected at its inner end to the sleeve and at its outer end to the cage, two springs located in the double cage both connected at their outer ends to the cage, one connected at its inner end to the sleeve and the other at its inner end to the arbor, substantially as described.

3. In a mechanism of the character described, the combination with a casing, of an arbor mounted in the casing, and of two diameters, a sleeve mounted to turn on the smaller diameter of the arbor, a single and a double cage mounted to turn on the arbor and sleeve, a spring located in the single cage and connected at its inner end to the sleeve and at its outer end to the cage, two springs located in the double cage both connected at their outer ends to the cage, one connected at its inner end to the sleeve and the other at its inner end to the arbor, a winding gear secured to the single cage, and means for turning the winding gear, substantially as described.

4. In a mechanism of the character described, the combination with a casing, of an arbor mounted in the casing, and of two diameters, a sleeve mounted to turn on the smaller diameter of the arbor, a single and a double cage mounted to turn on the arbor and sleeve, a spring located in the single cage and connected at its inner end to the sleeve and at its outer end to the cage, two springs located in the double cage both connected at their outer ends to the cage, one connected at its inner end to the sleeve and the other at its inner end to the arbor, a winding gear connected to said single cage, means for turning the winding gear, a driving gear secured to the arbor, a fan, and power transmitting mechanism between said last-mentioned gear and said fan, substantially as described.

In testimony whereof I have signed my name to this specification in the presence of two subscribing witnesses.

WILLIAM PETER HANSEN.

Witnesses:
W. H. TIGERMAN,
W. H. ARMSTRONG, Jr.